United States Patent [19]

Cooper

[11] 4,090,960
[45] May 23, 1978

[54] GAS ENERGIZING APPARATUS AND RELATED METHOD

[75] Inventor: Herbert W. Cooper, Jericho, N.Y.

[73] Assignee: Dynalytics Corporation, Hicksville, N.Y.

[21] Appl. No.: 467,876

[22] Filed: May 8, 1974

[51] Int. Cl.² .......................... C02B 1/38; C01B 13/10
[52] U.S. Cl. .................................. 210/63 Z; 210/192; 204/176; 250/540
[58] Field of Search .................. 204/176; 210/63, 192, 210/243; 250/539–541

[56] References Cited

U.S. PATENT DOCUMENTS

| | | | |
|---|---|---|---|
| 1,965,766 | 7/1934 | Hartman | 250/540 |
| 3,024,185 | 3/1962 | Fleck | 210/192 X |
| 3,336,099 | 8/1967 | Czulak et al. | 210/63 X |
| 3,364,129 | 1/1968 | Cremer et al. | 250/540 |
| 3,448,045 | 6/1969 | Hess et al. | 210/63 |
| 3,692,180 | 9/1972 | LaRous | 210/192 X |
| 3,766,051 | 10/1973 | Ballyky | 250/540 |

Primary Examiner—Thomas G. Wyse
Attorney, Agent, or Firm—Charles E. Baxley

[57] ABSTRACT

This disclosure teaches an apparatus and related method for energizing gas and more particularly generating ozone for treating water. An oxygen containing gas is introduced into a gap between two electrodes and the electrodes are connected each to an opposite pole of a high voltage source so that ozone is produced in the gap. The water cools one of the electrodes and the other electrode is formed as a heat pipe whereby it too is cooled. A porous material is arranged to pass the ozone into the water.

22 Claims, 7 Drawing Figures

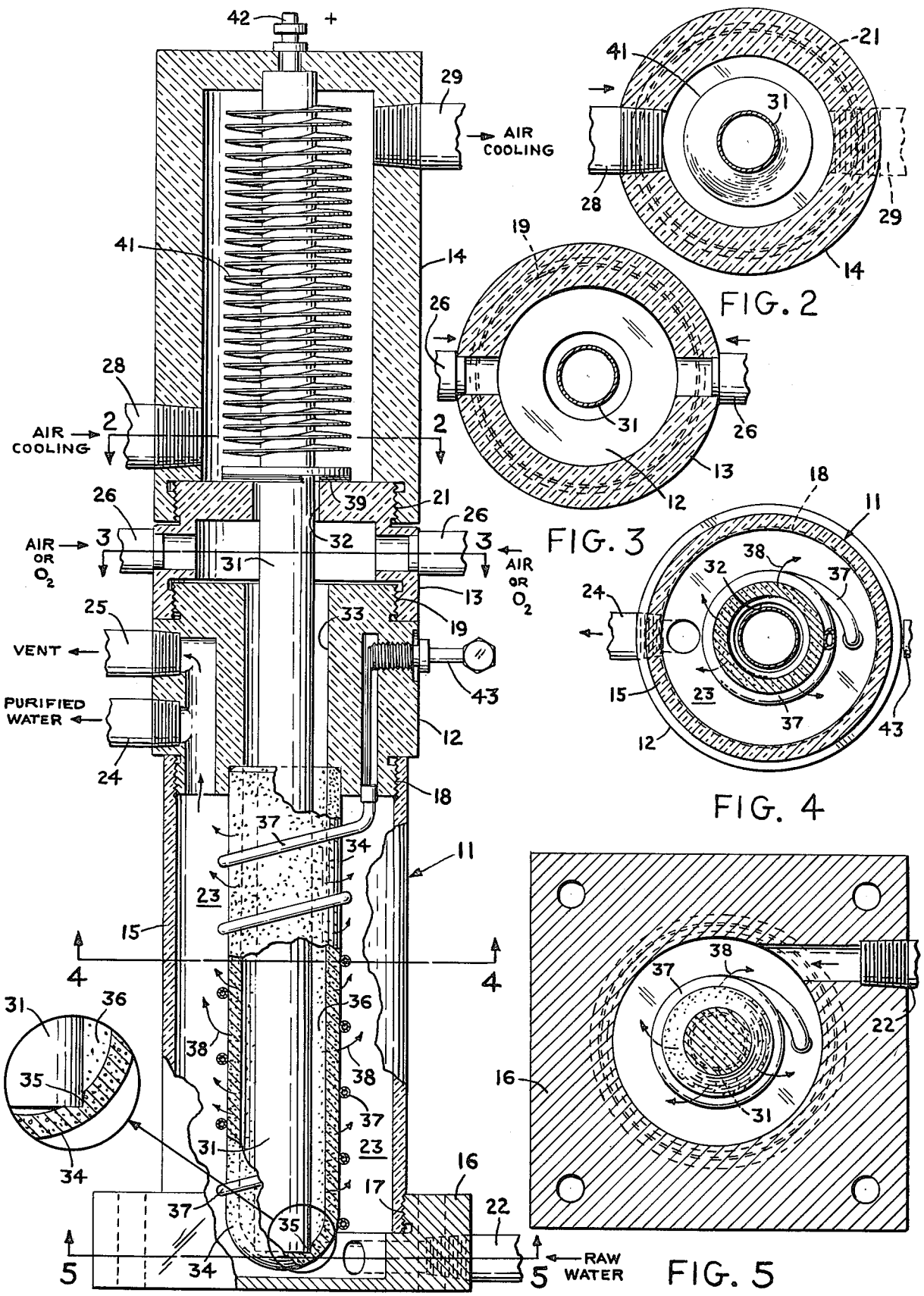

GAS ENERGIZING APPARATUS AND RELATED METHOD

BACKGROUND OF INVENTION

Most gas energizing apparatus, including commercial ozone generators, currently use an electrical corona discharge to produce ozone from an oxygen containing gas. The gas is passed through a small discharge gap and a high voltage forms a corona discharge in the gap whereby an ozone rich gas is produced. Ozone generators of the prior art are inefficient in terms of power consumption. Excess power is converted to heat and raises the temperature of the ozone produced whereby undesirable decomposition of the ozone results.

STATEMENT OF INVENTION

Stabilized production and effective use of ozone is taught in this disclosure by a useful, novel, unobvious and facile approach. An oxygen containing gas is introduced into a gap between two electrodes and the electrodes are connected each to an opposite pole of a high voltage source so that an ozone rich gas is produced in the gap. To avoid excessive heat buildup, the water to be treated is arranged to cool one of the electrodes and the other electrode is formed as a heat pipe so that it too is cooled. Pressurizing of the oxygen containing gas and arrangement of a porous material permits the gap to be operated dry and the ozone rich gas to pass into the water. It will be understood that this disclosure teaches an apparatus and related method which potentially have wider applications to energizing gases than merely production of ozone.

One object of this invention is to reduce excessive decomposition of the energized gas before it is put to use.

Another object of this invention is to remove excessive heat from the energized gas and from components of the generating apparatus.

Still another object of this invention is to promote efficiency of energized gas generation relative to power consumption.

Still another object of this invention is to promote entry of the energized gas into fluid being treated.

Still another object of this invention is to provide an apparatus of the character stated which is simple and inexpensive to manufacture as well as easy to maintain.

Still another object of this invention is to provide an apparatus of the character stated which is suited well otherwise to its intended functions.

DESCRIPTION OF DRAWINGS

The foregoing and other objects, features and advantages will appear more fully from a detailed description of a preferred embodiment of this invention and from claims, which follow, all viewed in conjunction with an accompanying drawing wherein:

FIG. 1 is a vertical sectional view of an apparatus in accordance with this invention.

FIG. 2 is a sectional view taken along line 2—2 of FIG. 1

FIG. 3 is a sectional view taken along line 3—3 of FIG. 1.

FIG. 4 is a sectional view taken along line 4—4 of FIG. 1.

FIG. 5 is a sectional view taken along line 5—5 of FIG. 1.

DESCRIPTION OF PREFERRED EMBODIMENT

Figures 6, 7:
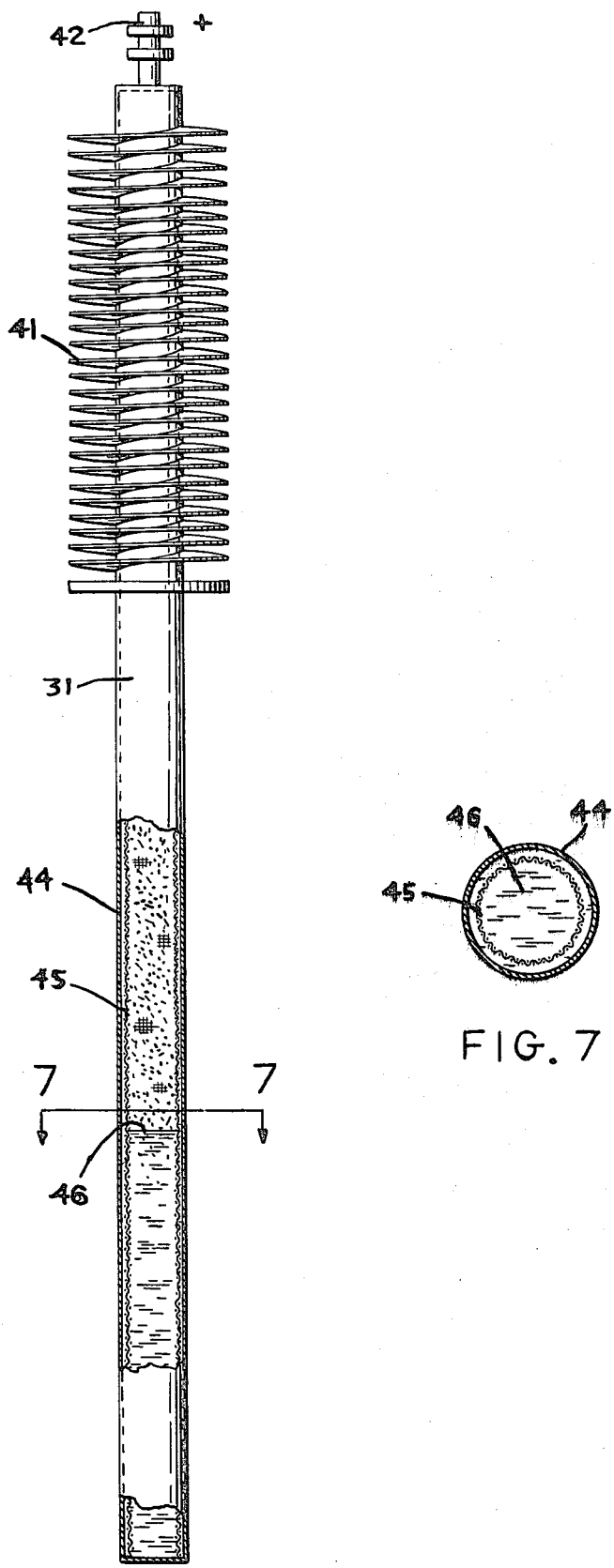
FIG. 6 is a broken sectional view of a first electrode according to this invention.
FIG. 7 is a section taken along line 7—7 of FIG. 6.

As seen in the drawing, the apparatus includes a water housing generally designated 11, a cap 12, an oxygen ring 13 and a bonnet 14 all assembled as shown. The water housing 11 is formed of a cylindrical shell 15 which is screwed into a base 16 at its lower end by means of threads 17 and at its upper end is screwed into the cap 12 by means of threads 18. The cap 12 is provided at its upper end with a threaded annular shoulder 19 onto which the oxygen ring 13 is screwed and the oxygen ring in turn has an upper end with a threaded annular shoulder 21 onto which is screwed the bonnet 14.

Water to be treated enters via a port 22 into a water chamber 23 and exits therefrom via a port 24. A vent 25 is also provided to exhaust gases from the treated water. Air, oxygen enriched air, oxygen or some other oxygen containing gas enters the oxygen ring 13 via ports 26 and exits therefrom via an annular gap 36. Cooling air enters the bonnet 14 via a port 28 and exits therefrom via a port 29.

A first electrode 31 is mounted centrally of both the water housing 11 and the bonnet 14 and the first electrode 31 penetrates through some openings 32 and 33 formed in the oxygen ring 13 and the cap respectively. The first electrode 31 sits in a porous filter formed as a sheath 34 which assists in centering the first electrode 31 by means of a centering groove 35. By this expedient the annular gap 36 is defined between the first electrode 31 and the porous sheath 34. A second electrode 37 is wound helically about the sheath 34 as will be described more fully.

The crux of the present invention is to form the first electrode 31 as a cooled heat pipe, while the second electrode 37 is cooled by contact with the water in the water chamber 23, and to pass the ozone rich gas as it is generated directly into the water. Toward this objective the oxygen containing gas is introduced under pressure to the gap 36 wherein it is charged by the electrodes each of which are connected to an opposite pole of a high voltage source as is well known in the art to produce an ozone rich gas 38 in the gap 36. The ozone rich gas 38 passes under pressure to the water chamber 23 through the porous sheath 34 with minimal decomposition of the ozone.

The porous sheath preferably has a density of from 50 to 95% and more preferably from 75 to 90% of its unformed parent material. The structure of the sheath 34 wall is irregularly cellular with not more than 0.5% of the openings on one surface extending through the sheath 34 wall to its opposite surface. The metal must be compatible with water, air, oxygen and ozone simultaneously. Satisfactory choices are nickel, various predominantly chrome-nickel-iron alloys such as AISI "18-8" stainless steels and aluminum alloys.

The first electrode 31 preferably is a hollow cylindrical copper tube and it extends from the water chamber 23 through a gasket 34 into the bonnet 14 wherein it is provided with some extended surface 41 which is shown here as helically wound fins, but could be studs, longitudinally organized fins or other forms of extended surface. The first electrode 31 is cooled by air which is circulated through the bonnet 14.

The first electrode 31 is shown in FIG. 6 to be a hollow cylindrical tube 44 closed at both ends and containing a porous material 45 (which may be a mesh of substantially the same material as the tube) on the inside surface of the tube 44 and filled with a material 46 that will vaporize and condense at operating temperatures of the first electrode 31. The first electrode 31 extends from the water chamber 23 through a gasket 34 into the bonnet 14 wherein it is provided with some extended surface 41 which is shown here as helically wound fins, but could be studs, longitudinally organized fins or other known forms of extended surface. The first electrode 31 is cooled by air which is circulated through the bonnet 14. The hollow cylindrical tube 44 typically may be made of various grades of steel, or copper alloys, or aluminum alloys or chromium-nickel-iron alloys. The vaporizing and condensing material 46 typically may be water, or methyl alcohol or ethyl alcohol or ammonia. The first electrode 31 is sometimes referred to as a heat pipe.

A terminal 42 is mounted on the upper end of the first electrode 31 and it projects out of the bonnet 14 for connection to a suitable electrical source (not shown). The second electrode 37 is affixed in electrical contact, for example by being wound helically about, the sheath 34 and it is connected to a terminal 43 which penetrates out of the cap 12 for connection to a suitable electrical source (not shown).

Typically the first electrode 31 operates at a temperature in the order of 100° C. The voltage drop across the gap 36 is generally from 7,000 to 15,000 volts and preferably about 10,000 volts. Frequencies may be anywhere from 60 to 25,000 cycles per second and may pulse. The voltage should not be of the constant direct variety.

It will be apparent to those skilled in manufacture and operation of gas energizing apparatus that wide deviations may be made from the preferred embodiment here described without departing from a main theme of invention which is set forth in the following claims.

I claim:

1. An apparatus comprising in combination:
   a first and a second electrode spaced apart to form a gap therebetween,
   means for introducing a gas into the gap,
   each of the electrodes connected with an opposite pole of a high voltage source to energize the gas in the gap,
   a fluid in contact with the second electrode,
   a porous material arranged to pass the energized gas into the fluid,
   the first electrode communicating in heat exchange relationship with a heat sink.

2. The apparatus of claim 1 with the first electrode extending remotely from the gap and having extended surface projecting therefrom to serve as the heat sink.

3. The apparatus of claim 2 with means for maintaining the gas in the gap at superatmospheric pressure.

4. The apparatus of claim 3 with the gas containing oxygen and the energized gas being ozone.

5. The apparatus of claim 4 with the fluid being a liquid.

6. The apparatus of claim 5 with the liquid being water.

7. The apparatus of claim 5 with the porous material being microporous porcelain.

8. The apparatus of claim 7 with the first and second electrodes arranged annularly relative each other.

9. The apparatus of claim 8 with the second electrode arranged outwardly of the first electrode.

10. The apparatus of claim 9 with the porous material formed as a sheath and the second electrode wound helically thereabout.

11. The apparatus of claim 5 with the porous material being a metal.

12. The apparatus of claim 11 with the first and second electrodes arranged annularly relative each other.

13. The apparatus of claim 12 with the second electrode arranged outwardly of the first electrode.

14. The apparatus of claim 13 with the porous material formed as a sheath and the second electrode wound helically thereabout.

15. A method for producing an energized gas and comprising steps as follows:
   providing a first and a second electrode spaced apart to form a gap therebetween,
   introducing the gas nonenergized into the gap,
   connecting each of the electrodes with an opposite pole of a high voltage source to energize the gas in the gap,
   passing a fluid in contact with the second electrode,
   providing a porous material arranged to pass the energized gas into the fluid,
   communicating the first electrode in heat exchange relationship with a heat sink.

16. The method of claim 15 and extending the first electrode remotely from the gap as well as providing extended surface projecting therefrom to serve as the heat sink.

17. The method of claim 16 and maintaining the gas in the gap at superatmospheric pressure.

18. The method of claim 17 with the unenergized gas being an oxygen containing gas and the energized gas being ozone.

19. The method of claim 18 with the fluid being a liquid.

20. The method of claim 19 with the liquid being water.

21. The method of claim 19 with the porous material being microporous porcelain.

22. The method of claim 19 with the porous material being a metal.

* * * * *